US012668027B2

(12) United States Patent
Mukai et al.

(10) Patent No.: US 12,668,027 B2
(45) Date of Patent: Jun. 30, 2026

(54) MANUFACTURING METHOD OF TUBE-ATTACHED COUPLING STRUCTURE AND TUBE-ATTACHED COUPLING STRUCTURE

(71) Applicant: TAISEI KOGYO CO., LTD., Tokyo (JP)

(72) Inventors: Yasuo Mukai, Tokyo (JP); Atsushi Koyama, Kanagawa (JP)

(73) Assignee: TAISEI KOGYO CO., LTD., Tokyo (JP)

( * ) Notice: Subject to any disclaimer, the term of this patent is extended or adjusted under 35 U.S.C. 154(b) by 116 days.

(21) Appl. No.: 18/560,677

(22) PCT Filed: Mar. 20, 2023

(86) PCT No.: PCT/JP2023/010927
§ 371 (c)(1),
(2) Date: Nov. 14, 2023

(87) PCT Pub. No.: WO2023/203936
PCT Pub. Date: Oct. 26, 2023

(65) Prior Publication Data
US 2024/0360925 A1      Oct. 31, 2024

(30) Foreign Application Priority Data
Apr. 22, 2022      (JP) ................................. 2022-070639

(51) Int. Cl.
*B29C 65/14*          (2006.01)
*C09J 5/06*           (2006.01)
(Continued)

(52) U.S. Cl.
CPC ............. *B29C 65/1403* (2013.01); *C09J 5/06* (2013.01); *F16L 13/10* (2013.01); *F16L 13/122* (2013.01); *F16J 15/14* (2013.01)

(58) Field of Classification Search
CPC . F16L 13/00; F16L 13/10; F16L 13/11; F16L 13/116; F16L 13/103;
(Continued)

(56) References Cited

U.S. PATENT DOCUMENTS 1,534,425 A * 4/1925 Stowell ................... F16L 13/11
285/285.1
1,979,470 A * 11/1934 Johnston ................. F16L 13/11
277/316
(Continued)

FOREIGN PATENT DOCUMENTS

DE          102008009371 A1      8/2009
DE          112022001357 T5      12/2023
(Continued)

OTHER PUBLICATIONS

International Search Report in PCT/JP2023/010927, mailed May 23, 2023, 5pp.
(Continued)

*Primary Examiner* — David Bochna
(74) *Attorney, Agent, or Firm* — HAUPTMAN HAM, LLP

(57) ABSTRACT

A tube-attached coupling structure is provided by using a piping coupling with good compatibility, workability and processability. A manufacturing method of the tube-attached coupling structure includes a step of preparing a photocurable gel-like body in a hollow cylindrical shape, a step of fitting the photocurable gel-like body in the attaching hole, a step of inserting an end portion of a connection tube into a hollow hole of the photocurable gel-like body, and a step of curing the photocurable gel-like body by irradiating the photocurable gel-like body with light.

5 Claims, 3 Drawing Sheets

(51) Int. Cl.
_F16L 13/10_ (2006.01)
_F16L 13/12_ (2006.01)
_F16J 15/14_ (2006.01)

(58) Field of Classification Search
CPC ............ B29C 65/1403; B29C 65/1406; B29C
65/1409; B29C 65/1412; C09J 5/06
See application file for complete search history.

(56) References Cited

U.S. PATENT DOCUMENTS

| | | | | |
|---|---|---|---|---|
| 3,877,518 | A | * | 4/1975 | Dreksler .................. F28F 9/26 |
| | | | | 285/134.1 |
| 4,196,923 | A | * | 4/1980 | Zimmerli ............. F16L 13/103 |
| | | | | 285/422 |
| 11,988,304 | B2 | * | 5/2024 | Kryger ................. F16L 13/103 |
| 2006/0214418 | A1 | * | 9/2006 | Pascuzzi ............ B29C 66/5221 |
| | | | | 156/296 |
| 2011/0021705 | A1 | | 1/2011 | Imoto et al. |
| 2011/0094992 | A1 | * | 4/2011 | Bilcai ....................... F28F 9/26 |
| | | | | 156/275.3 |
| 2015/0219254 | A1 | * | 8/2015 | Lee .................... B29C 65/5057 |
| | | | | 285/294.1 |
| 2016/0046069 | A1 | * | 2/2016 | Gläsel .................. B29C 65/562 |
| | | | | 138/120 |
| 2018/0127612 | A1 | | 5/2018 | Sato et al. |
| 2018/0194890 | A1 | | 7/2018 | Dubruel et al. |
| 2019/0186658 | A1 | * | 6/2019 | Rettew ................. F16L 13/116 |
| 2022/0233812 | A1 | * | 7/2022 | Farrell ................. B29C 66/322 |

FOREIGN PATENT DOCUMENTS

| | | | |
|---|---|---|---|
| EP | 0944794 | B1 | 8/2002 |
| JP | 2005-120820 | A | 5/2005 |
| JP | 2009-120663 | A | 6/2009 |
| JP | 2010-516824 | A | 5/2010 |
| JP | 2011-514501 | A | 5/2011 |
| JP | 2012-037045 | A | 2/2012 |
| JP | 2013-213175 | A | 10/2013 |
| JP | 2015-520242 | A | 7/2015 |
| JP | 2016-127091 | A | 7/2016 |
| JP | 2016-147969 | A | 8/2016 |
| JP | 2019-143660 | A | 8/2019 |
| WO | 2008086954 | A1 | 7/2008 |
| WO | 2009101177 | A1 | 8/2009 |
| WO | 2013192515 | A1 | 12/2013 |
| WO | 2017038244 | A1 | 3/2017 |

OTHER PUBLICATIONS

Written Opinion in PCT/JP2023/010927, mailed May 23, 2023, 4pp.
Office Action in DE application No. 112023000051.4, dated Jan. 16, 2025, 15pp.
International Search Report in PCT/JP2022/045010, mailed Feb. 21, 2023, 5pp.
Office Action in DE application No. 112023000051.4, dated Aug. 22, 2024, 16pp.
Written Opinion in PCT/JP2022/045010, mailed Aug. 20, 2024, 10pp.

* cited by examiner

MANUFACTURING METHOD OF TUBE-ATTACHED COUPLING STRUCTURE AND TUBE-ATTACHED COUPLING STRUCTURE

CROSS REFERENCE TO RELATED APPLICATION

The present application is a National Phase of International Application No. PCT/JP2023/010927 filed Mar. 20, 2023, which claims the priority of Japanese Patent Application No. 2022-070639 filed on April 22 in 2022 in Japan, the disclosure of which is herein incorporated in its entirety by reference.

TECHNICAL FIELD

The present invention relates to a manufacturing method of a tube-attached coupling structure and the tube-attached coupling structure.

BACKGROUND ART

Piping couplings are each used by screwing a screw portion into a screw hole processed portion on an attaching side, and attaching a hose or a tube to an opposite side of the coupling. Since screw standards vary by country and industrial field, and there are hoses or tubes of various sizes, piping couplings lack in compatibility.

A conventional ordinary coupling structure of a coupling and a tube connection portion includes a coupling body 20 having an insertion sleeve 21 for a soft resin tube 10, a cap nut 30 screwable to a drum portion 22 of the coupling body 20, a split-ring-shaped chuck ring 40 that accommodates the soft resin tube 10 in the cap nut 30 in an inserted state, as shown in FIG. 5, for example. According to this type of coupling structure, by inserting the soft resin tube 10 into the sleeve 21 of the coupling body 20 via the cap nut 30 and the chuck ring 40, and fastening the cap nut 30 to the drum portion 22 of the coupling body 20, the chuck ring 40 is reduced in diameter to fasten the soft resin tube 10 to the aforementioned sleeve 21 for use, and the number of components is large to increase cost, in addition to which, the number of man-hours of a tube attaching work process, screw-in torque management on an attaching side and the like is also large.

A general rule for pipe couplings is that screw hole processing is applied to the attaching side. As the screw hole cutting method, for example, a center hole is drilled with a center drill first, subsequently, a pilot hole is drilled by drilling, after which, specific processing such as reaming, screw cutting, and counterbore processing is applied depending on the application. For screw cutting, tapping is applied after pilot hole processing. A blade dedicated for screw cutting and called a tap is used, and is put into a hole at a rotation speed and feed rate of a fixed ratio to create a spiral screw hole. There is a problem that screw hole processing takes time and man-hours, and the more screw hole processing there is, the higher the product cost.

On the other hand, in order to prevent or inhibit gas leakage from a screw coupling portion provided in gas piping, there is disclosed a protection method for a screw coupling portion in which an outer end portion of at least a screwed spot of a screw coupling portion is coated with a photocurable resin composition to form a covering portion, and the covering portion is irradiated with light to cause the photocurable resin composition to undergo curing reaction to form a protection layer for the screw coupling portion (see Patent Literature 1, for example).

CITATION LIST

Patent Literature

Patent Literature 1: Japanese Patent Laid-Open No. 2012-37045

SUMMARY OF INVENTION

Technical Problem

The method described in Patent Literature 1 maintains airtightness of the screw coupling portion by using a photocurable resin composition but does not differ from the conventional method in terms of compatibility between tubes and couplings, the number of components, and the number of working hours, and also requires additional time and man-hours, and a problem remains that the product cost increases. Thus, the present invention has an object to provide a tube-attached coupling structure by using a piping coupling with good compatibility, workability and processability.

Solution to Problem

The present invention has been made to solve the above-described problem, and uses a photocurable gel-like cylinder coupling having a hole smaller than an outside diameter of a connection tube. By inserting the connection tube through this hole, the photocurable gel-like body having self moldability expands outward and can fit closely to the attaching hole, and by subsequently curing the photocurable gel-like cylinder coupling by light irradiation, airtightness and adhesiveness of the tube attaching hole are maintained.

Specifically, the present invention includes the following embodiments.

(1) A manufacturing method of a tube-attached coupling structure in which a connection tube is attached to a base body having an attaching hole, including the steps of preparing a photocurable gel-like body in a hollow cylindrical shape (S1), fitting the photocurable gel-like body into the attaching hole (S2), inserting an end portion of the connection tube into a hollow hole of the photocurable gel-like body (S3), and curing the photocurable gel-like body by irradiating the photocurable gel-like body with light (S4).

(2) The manufacturing method of a tube-attached coupling structure as set forth in (1), wherein the step of preparing the photocurable gel-like body includes producing the photocurable gel-like body in the hollow cylindrical shape by pouring a solution of a photocurable gel-like body before gelation into a molding die.

(3) The manufacturing method of a tube-attached coupling structure as set forth in (1), wherein the step of preparing the photocurable gel-like body includes producing a hole smaller than an outside diameter of the connection tube, in a substantially center of the photocurable gel-like body produced in advance.

(4) The manufacturing method of a tube-attached coupling structure as set forth in (1), wherein the attaching hole has a reverse tapered shape in which a diameter expands toward an inside from a surface of the base body.

(5) The manufacturing method of a tube-attached coupling structure as set forth in (1), wherein the base body has annular, spiral or dot-shaped irregularities, on an inner surface of the attaching hole.

(6) The manufacturing method of a tube-attached coupling structure as set forth in any one of (1) to (5), wherein the photocurable gel-like body includes at least a photocurable composition (A) including a polyfunctional urethane (meth)acrylate and a photopolymerization initiator, and polyurethane (B).

(7) The manufacturing method of a tube-attached coupling structure as set forth in (6), wherein the photocurable gel-like body has hardness of E1 or more and E30 or less by measurement by a durometer based on JIS K 6235.

(8) A tube-attached coupling structure including a base body including an attaching hole, and a connection tube attached to the attaching hole by a photocurable resin, wherein the photocurable resin is a resin cured in a shape to close a gap between the attaching hole and the connection tube in a connection part.

(9) The tube-attached coupling structure as set forth in (8), wherein the photocurable resin has hardness of E75 or more by measurement by a durometer based on JIS K 6235.

Advantageous Effect of Invention

According to the manufacturing method of the present invention, it is possible to provide the tube-attached coupling structure with good compatibility, workability and processability without having to prepare a piping coupling for each of sizes and standards of tubes and attaching holes.

DESCRIPTION OF EMBODIMENTS

Figure 1:
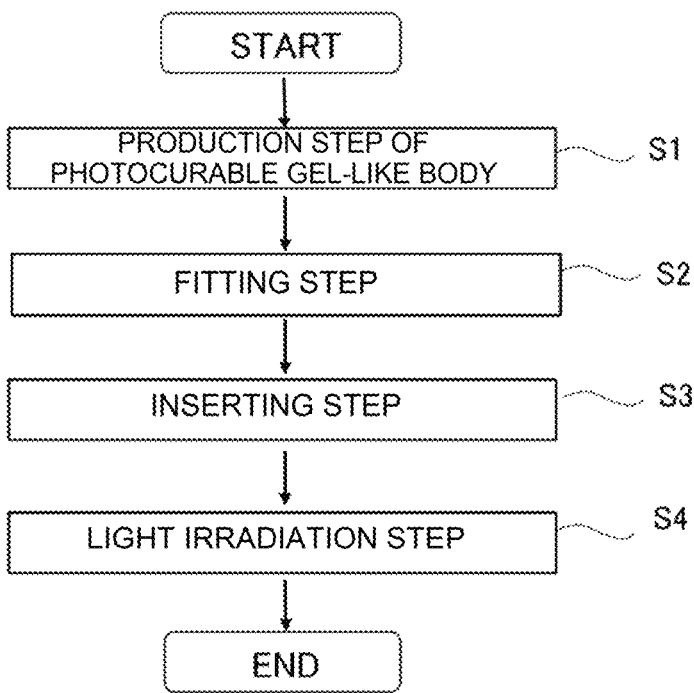
FIG. 1 is a process flowchart of a manufacturing method of a tube-attached coupling structure according to one embodiment.

Next, respective embodiments of the present invention will be described with reference to the drawings. Note that the respective embodiments described hereinafter are not intended to limit the inventions of the claims, and all various elements and combinations thereof described in the respective embodiments are not always essential to the solution of the present invention.

1. Definition

<Photocurable Gel-Like Body>

Herein, a term "photocurable gel-like body" collectively refers to materials in forms of gel, gummy, and jelly that can be cured by irradiation with light such as visible light or ultraviolet light. A gel-like body (gel material) is a soft material having a three-dimensionally cross-linked polymer network and is swollen by containing water or an organic solvent inside of the polymer network. A gelatinized material containing water is called a hydrogel, and a gelatinized material containing an organic solvent is called an organogel or the like. Gel materials have conventionally been used in daily necessities such as disposable diapers, contact lenses, a superabsorbent polymer, and sustained release agent, as well as food, cosmetics, and the like, and in recent years, its applications have been wide-ranging, including medical materials such as poultices, drug delivery systems, and regenerative medical materials, electronic materials such as lithium-ion polymer batteries, shock absorbers, vibration damping and soundproofing materials and the like. However, since gel materials generally have low mechanical strength and are destroyed by slight stress, they are not suitable for applications that require stable mechanical strength, but the photocurable gel-like body of the present embodiment has self-moldability that deforms to match the shape of a use surface before irradiation with light, and high mechanical strength by curing after being irradiated with light.

As materials that impart photocurability to such gel materials, two chemistries are widely used. One is acrylate, and the other is an epoxy. Systems based on acrylate are triggered by photo-generated radical species. Since a half-life of radicals in photoinitiation and polymerization is relatively short, polymerization occurs only when active irradiation is performed. Systems based on epoxy are cured through a cation mechanism, and by this mechanism, acid usually latent in a form of an onium salt is fragmented by UV radiation to form a strong acid, which then initiates self-addition of an epoxy group to generate an ether linkage. In rigid systems, cation centers are entrapped in a matrix and a post bake (post-bake) can be used to increase matrix mobility and thus hardening. In soft silicon epoxy, polymerization can continue at a room temperature. A cured product of a photocurable gel-like body is sometimes referred to as a "photocurable resin".

<Base Body>

Herein, a "base body" refers to a pipe or a device that is connected to a coupling, and fluid equipment in which a fluid flows is cited, for example. When the fluid is water, examples of the fluid equipment include a water faucet and the like. On the other hand, when the fluid is air, a pneumatic piping coupling unit and the like are illustrated. In an ordinary assembly device and manufacturing device, a pneumatic cylinder is used as an actuator due to ease of operation and simplicity, and in order to control supply of compression air to the pneumatic cylinder, a pneumatic system having a directional control valve, a pressure control valve, a flow rate control valve and the like is often used. The pneumatic system like this has many pneumatic pipes including hoses, tubes and the like to supply compression air to pneumatic operation equipment such as a pneumatic cylinder, and a directional control valve from a pneumatic source, and such pneumatic pipes are connected to the pneumatic source via a piping coupling unit.

If the pneumatic piping coupling unit is disposed between the pneumatic source and the pneumatic operation equipment, and the pneumatic operation equipment and the pneumatic source are connected via a piping coupling unit, the pneumatic system can be easily rearranged by connecting the pneumatic operation equipment to the pneumatic piping coupling unit via the pneumatic piping when increasing or changing the pneumatic operation equipment. As the piping coupling unit like this, a piping coupling unit having two coupling blocks in each of which a plurality of communication holes are formed and a coupling such as a quick coupling communicating with the respective communication holes is provided is used, and a plurality of pneumatic piping coupling units are used in the pneumatic system.

<Connection Tube>

Manufacturing devices of mass-produced products such as ICs and LSIs are transported to production lines in a state where the manufacturing devices are disassembled into a plurality of parts and are assembled in the production lines and used. Therefore, when assembling a manufacturing device, operations of connecting a large number of hoses and tubes are unavoidable, and in order to easily connect the tubes to each other, pneumatic piping coupling devices are used. When such a pneumatic piping coupling device is used, specific tubes among a plurality of tubes can be reliably connected to each other, and a possibility of incorrect piping can be eliminated.

Materials, sectional shapes, and sizes of the connection tubes are not particularly limited. The materials may be any of, for example, metal (for example, stainless steel, brass or the like), for example, ceramics (for example, alumina, silicon carbide or the like), for example, resin (for example, synthetic rubber such as nitril rubber and ethylene propylene rubber, synthetic resin such as polypropylene and polyamide, or the like). The materials may be composite materials of these raw materials, and flexible raw materials, for example, rubber and resin are preferable. The sectional shape of the connection tube is preferably in a circular shape, which is excellent in pressure resistance.

2. Manufacturing Method of Tube-Attached Coupling Structure

Next, the manufacturing method of a tube-attached coupling structure will be descried with reference to FIG. 1. FIG. 1 is a process flowchart of the manufacturing method of a tube-attached coupling structure according to one embodiment. The manufacturing method according to the present embodiment includes a production step of a photocurable gel-like body of preparing a photocurable gel-like body in a hollow cylindrical shape (S1), a fitting step of fitting the photocurable gel-like body into an attaching hole (S2), an inserting step of inserting an end portion of the connection tube into a hollow hole of the photocurable gel-like body (S3), and a light irradiation step of curing the photocurable gel-like body by irradiation with light (S4).

<Production Step of Photocurable Gel-Like Body (S1) >

The photocurable gel-like body produced in the present step is preferably gummy-like, has self-moldability to match a shape of a surface on which it is used, and is capable of being cured by light irradiation while maintaining a molded shape. As an example, a photocurable composition containing a polyfunctional urethane (meth)acrylate and a photopolymerization initiator and polyurethane may be used. The polyfunctional urethane (meth)acrylate has a urethane bond formed by reacting an isocyanate group with a hydroxy group, and an acrylic group. The acrylic group is at least one of an acryloyl group and a methacryloyl group (also referred to as "methacryloyl group".) The polyfunctional urethane (meth)acrylate is preferably an oligomer rather than a monomer. An oligomer means a polymer in which a linking unit of monomers (also referred to monomers) is relatively small, and the number of monomers is 2 or more and about 1000 or less. Polyfunctional urethane (meth)acrylate is "polyfunctional", and therefore means one in which the number of functional groups (acrylic groups, acryloyl groups) is two or more, and preferably three or more.

The polyfunctional urethane (meth)acrylate can be produced by esterifying a polyurethane oligomer obtained by reacting a polyether polyol or polyester polyol with an isocyanate compound, with (meth)acrylic acid, for example. The polyfunctional urethane (meth)acrylate may be an aliphatic urethane (meth)acrylate, or an aromatic urethane (meth)acrylate.

The photopolymerization initiator is a composition (component) that can initiate radial polymerization of urethane (meth)acrylate by irradiation with light with visible light or ultraviolet light as a typical example, in coexistence with urethane (meth)acrylate. As the photopolymerization initiator, it is possible to use, for example, one, or two or more of an acetophenone compound such as 4-phenoxydichloroacetophenone, diethoxyacetophenone, 2-hydroxy-2-methyl-1-phenylpropan-1-one, 1-(4-isopropylphenyl)-2-hydroxy-2-methylpropan-1-one, 1-hydroxycyclohexylphenylketone, 4-(2-hydroxyethoxy)-phenyl (2-hydroxy-2-propyl)ketone, 2-methyl-[4-(methylthio)phenyl]-2-morpholino-1-propanone, and 2,2-dimethoxy-2-phenylacetophenone; benzoin and a benzoin compound such as benzoin methyl ether, benzoin isoethyl ether, benzoin isopropyl ether, and benzoin isobutyl ether; benzophenone and a benzophenone compound such as benzoyl benzoic acid, methyl benzoylbenzoate, 4-phenylbenzophenone, hydroxybenzophenone, 4-benzoyl-4'-methyldiphenyl sulfide, and 3,3'-dymethyl-4-methoxybenzophenone; thioxanthone and a thioxanthone compound such as 2-chlorothioxanthone, 2,4-dichlorothioxasnthone, 2-methylthioxantone, 2,4-dimethylthioxanthone, 2,4-diethylthioxanthone, isopropylthioxanthone, and 2,4-diisopropylthioxanthone; 4,4'-dimethylaminothioxanthone, 4,4'-diethylaminobenzophenone, α-acyloxime ester, benzyl, methyl benzoylformate ("Biacure 55"), and an anthraquinone compound such as 2-ethyl anthraquinone; an acylphosphine oxide compound such as diphenyl(2,4,6-trimethylbenzoyl)phosphine oxide, bis (2,4,6-trimethylbenzoyl)phenyl phosphine oxide, and the like. A particularly preferable photopolymerization initiator is an acylphosphine oxide compound, an even more preferable photopolymerization initiator is a bisacylphosphine oxide-based photopolymerization initiator, and among them, a particularly more preferable photopolymerization initiator is a bis (2,4,6-trimethylbenzoyl)phenyl phosphine oxide.

Polyurethane can be synthesized by heating a thermosetting composition containing at least a polyol compound (also simply referred to as a "polyol"), an isocyanate compound (also simply referred to as an "isocyanate"), and an acrylate monomer as a hydroxyl group-providing additive. In addition to polyurethane, a commonly used resin such as polyester, thermoplastic elastomer, and the like can be used. Further, a plurality of these resins may be combined, or a carbon raw material, metal powder, glass fiber and the like may be used in combination.

The production method of the photocurable gel-like body includes a mixing step of mixing a thermosetting composition and the photocurable composition, and a thermosetting step of thermosetting the mixture after the mixing step (gelling step). The photocurable composition:thermosetting composition is within a range of 25:75 to 55:45 in mass ratio. The photocurable composition:thermosetting composition is preferably within a range of 41:59 to 50:50 in mass ratio. An acrylate monomer belonging to the thermosetting composition is preferably hydroxyethyl acrylate and/or pentaerythritol (tri/tetra) acrylate.

Next, a more specific and illustrative manufacturing method of a photocurable urethane gel-like body will be described.

The photopolymerization initiator is dissolved in dehydrated acetone as a solvent. Then, the dissolved substance is added to a polyfunctional urethane (meth)acrylate. The mixture of the photopolymerization initiator, polyfunctional urethane (meth)acrylate, and dehydrated acetone is heated at a temperature of 90 to 100° C. Thus, the photocurable composition is completed. A hydroxy group-giving additive (acrylate monomer) is added to a polyol compound that is a main ingredient of polyurethane, and mixed. As a result, an acryloyl group is introduced into the polyol compound. Next, an isocyanate compound as a curing agent is added to the mixture and the mixture is stirred. Thus, the thermosetting composition is completed. Next, the aforementioned photocurable composition and thermosetting composition are stirred and mixed, and heated. A heating temperature is not limited as long as it is the temperature at which the thermosetting composition can be cured but is preferably 80° C. or higher and 120° C. or lower, more preferably 90° C. or higher and 110° C. or lower. The mixture of the photocurable composition and the thermosetting composition is preferably heated after being put into a molding die. Thus, the thermosetting urethane gel-like body is completed. A structure of the molding die is not particularly limited, but use of a ring-shaped molding die is preferable because a hollow cylindrical photocurable gel-like body can be produced.

Figure 2:
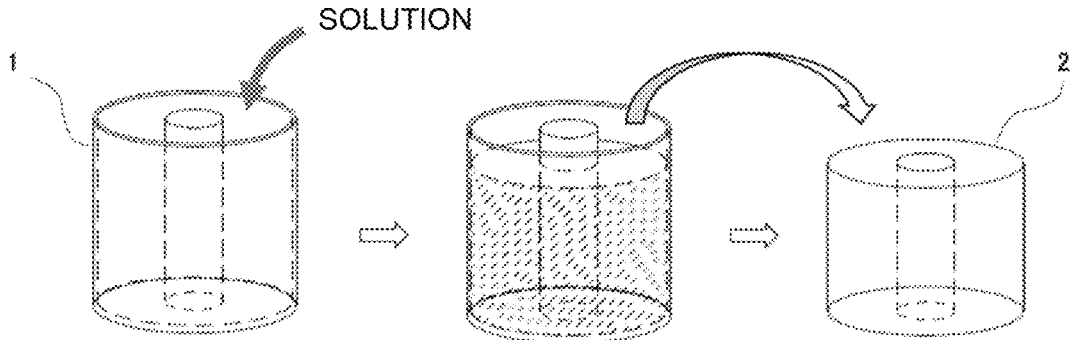
FIG. 2 is a schematic view showing a step of preparing a photocurable gel-like body in a hollow cylindrical shape according to one embodiment.

FIG. 2 is a schematic view showing a process of producing a photocurable gel-like body in a hollow cylindrical shape by using such a molding die. For example, a solution (in FIG. 2, simply shown as "solution") in a photocurable gel state before gelation is poured into a molding die 1 produced of silicone or the like. When the photocurable gel-like body is composed of the aforementioned thermosetting composition and photocurable composition, the mixture can be gelled by heating it first. By extracting the photocurable gel-like body from the molding die after the mixture is cooled to a room temperature and gelling is completed, a photocurable gel-like body 2 in a hollow cylindrical shape can be produced. Herein, the term "hollow cylindrical shape" is not limited to a shape having a sectional outer circumference and a sectional inner circumference that are circular, but is a concept including ellipses, and polygons equal to or larger than quadrangles, and further is a concept also including truncated cones and truncated pyramids outer peripheral surfaces of which have tapered angles.

In another embodiment, a photocurable gel-like body in a hollow cylindrical shape may be produced by producing a hole smaller than an outside diameter of the connection tube in a substantially center of the photocurable gel-like body produced in advance. The photocurable gel-like body 2 is soft because formation of a three-dimensional network is insufficient before curing by light irradiation, and can be easily cut and processed by an ordinary drilling tool. At this time, the hole preferably has a hole diameter smaller by about 0 to 10% than the outside diameter of the connection tube. This is because the photocurable gel-like body 2 has a predetermined elasticity, and therefore, when the connection tube is inserted, it can expand outward and self-mold to closely fit and increase adhesion more.

Hardness of the photocurable urethane gel-like body is preferably E1 or more and E30 or less, and more preferably E3 or more and E10 or less by hardness determined by type E durometer based on JIS K 6253. The photocurable urethane gel-like body having the above-described hardness range is suitable for use as a tube coupling by being filled into a screw hole. Especially when the gel-like body is used to attach a tube in place of a one-touch coupling, the gel-like body is easily filled in a screw hole of the attaching destination, and it is also easy to insert the tube into the gel-like body and penetrate it. Further, the gel-like body has appropriate hardness, do not liquefy, and can ensure sealing performance with a tube and a screw hole, so that the gel-like body is suitable for use as a pipe coupling.

<Fitting Step (S2)>

Figure 3:
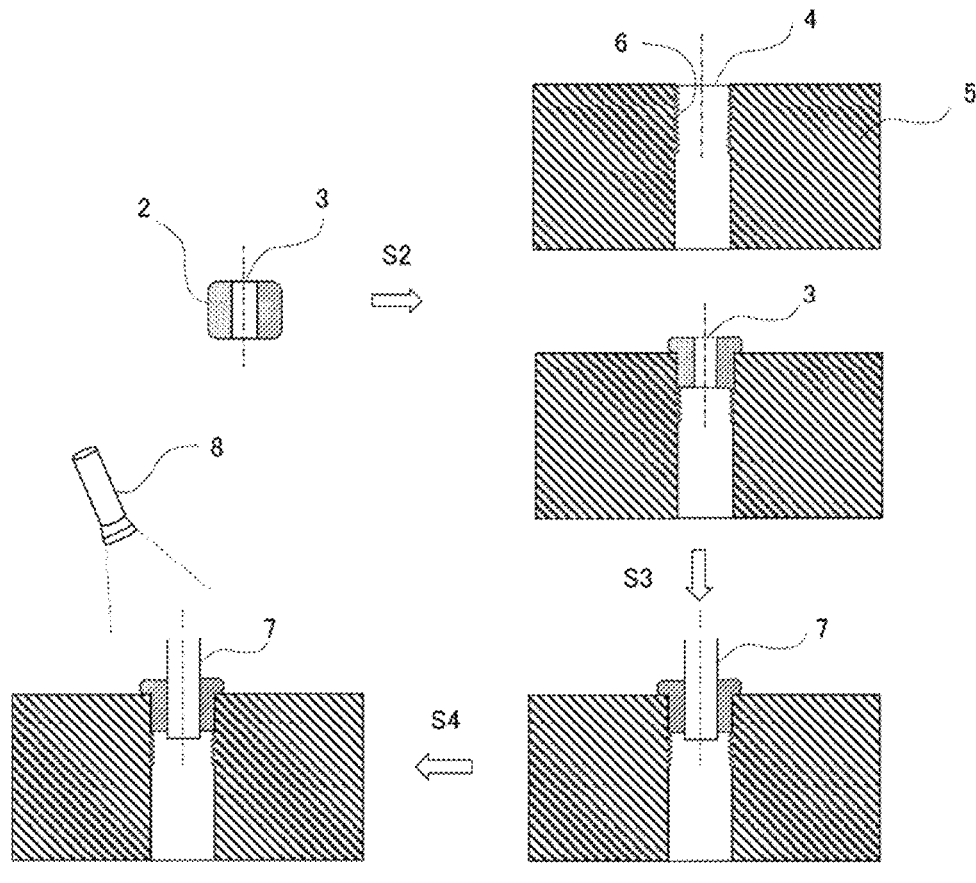
FIG. 3 is a schematic sectional view showing manufacturing process steps (S2 to S4) of the tube-attached coupling structure according to one embodiment.

Next, the photocurable gel-like body is fitted into an attaching hole. The present step (S2) and following steps (S3, S4) will be described with reference to FIG. 3. FIG. 3 is a sectional schematic view showing a manufacturing process (S2 to S4) of the tube-attached coupling structure according to the present embodiment. In the present process, the photocurable gel-like body 2 having a hole 3 is fitted into an attaching hole 4. A shape of the attaching hole 4 is not particularly limited, and a section thereof may be circular or polygonal. An inner surface of the attaching hole 4 may or may not have a screw thread, but preferably has some surface roughness from a viewpoint of increasing adhesion with the photocurable gel-like body 2. In FIG. 3, screw processing 6 is applied to the attaching hole 4, which is preferable because the photocurable gel-like body 2 expands to match the shape of the screw thread and can more increase close fitting and adhesion to the base body 5.

Here, a several kinds of photocurable gel-like bodies 2 are produced in advance to match the shape of the attaching hole 4 of the base body 5. The sectional shape of the photocurable gel-like body 2 is preferably a circle or a polygon having a slightly larger outside diameter than an opening portion of the attaching hole 4. This is because the photocurable gel-like body 2 has a predetermined elasticity, and therefore can be deformed to match the shape of the attaching hole 4. This eliminates a need to prepare a coupling that strictly matches a size of the attaching hole, and it is possible to use the photocurable gel-like body 2 of a same size as a coupling for attaching holes of approximately a same size even if inch and millimeter standards are different.

<Inserting Step (S3)>

Next, in the present step, an end portion of a connection tube 7 is inserted into the hollow hole 3 of the photocurable gel-like body 2 attached to the attaching hole 4. Thereby, the photocurable gel-like body 2 can be expanded outward and closely fitted and adhered to the inner surface of the attaching hole 4.

<Light Irradiation Step (S4)>

Finally, the photocurable gel-like body 2 in which the connection tube 7 is inserted is cured by using a light irradiation device 8 that can emit visible light or ultraviolet light to be polyurethane. The photocurable urethane gel-like body 2 in which the connection tube 7 is inserted is irradiated with light from a surface thereof and is curable. The deeper a curing depth, the more preferable, and the curing depth is more preferably 15 mm or more. The light irradiation device 8 can emit visible light and is not particularly limited, and an illumination device having a light source of a light wavelength of 400 to 650 nm, for example, can be used. An estimate of a light irradiation time period when curing the photocurable gel-like body is, for example, 1 to 300 seconds, preferably 10 to 200 seconds, and more preferably 20 to 150 seconds, thought it depends on balance with illuminance of the light source, and after 1 to 60 minutes, especially 5 to 30 minutes after light irradiation, the photocurable gel-like body loses elasticity and a cured product with high mechanical strength can be obtained.

3. Manufacturing Methods According to Other Embodiments

Figure 4A:
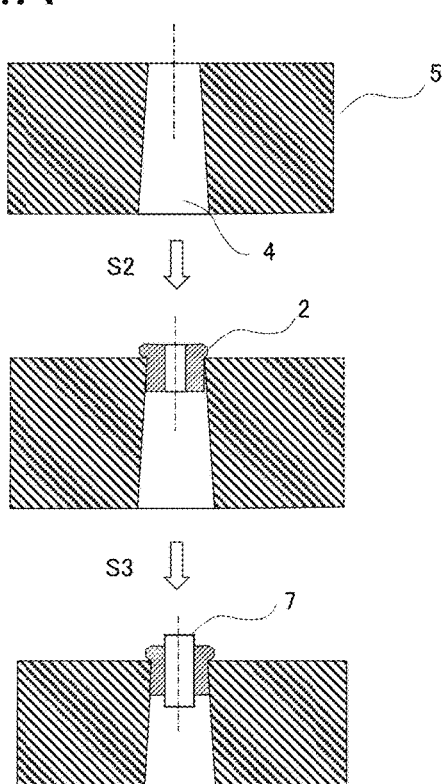
FIGS. 4A and 4B are schematic sectional views showing a manufacturing method of a tube-attached coupling structure according to another embodiment.
Figure 4B:
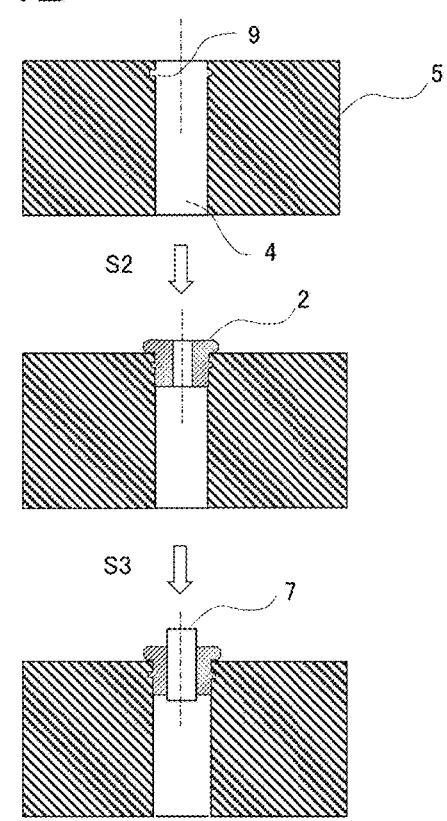
Figure 5:
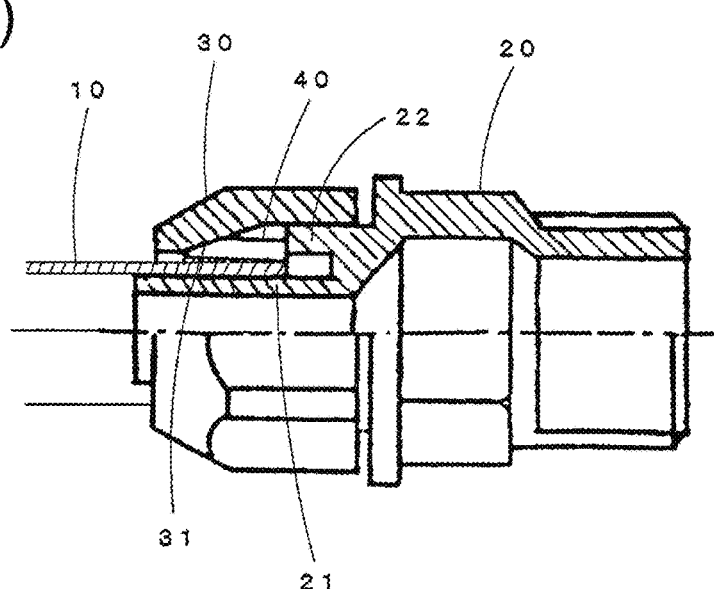
FIG. 5 is a sectional view showing an ordinary coupling structure in a conventional art.

FIGS. 4A and 4B are schematic views showing a manufacturing method of a tube-attached coupling structure according to another embodiment. FIG. 4A differs from the above-described embodiment in that a shape of an attaching hole 4 of a base body 5 is a reverse tapered shape with a diameter expanding from a surface to an inside of the base body 5. Since the photocurable gel-like body 2 has a self moldability according to the shape of the attaching hole 4, the diameter expands toward a deep portion of the attaching hole 4 to make it difficult for an attached tube to be extracted after curing by light irradiation. It is considered that thereby, airtight sealing performance of the tube attaching hole is maintained and mechanical strength also increases.

FIG. 4B differs from the above-described embodiment in that it has a groove 9 on an inner surface of an attaching hole 4 of a base body 5. The groove 9 may be formed in an annular shape or a spiral shape on the inner surface of the attaching hole, and may be in a shape of a single groove or multiple grooves. Alternatively, the groove 9 may be dotted (dot-like) irregularities formed on the inner surface of the attaching hole 4. It is considered that thereby, a cured product after the photocurable gel-like body 2 is cured is locked in the groove 9 to thereby maintain airtight sealing performance of the tube attaching hole and increase the mechanical strength.

4. Tube-Attached Coupling Structure

In a different aspect of the present invention, a tube-attached coupling structure including a base body having an attaching hole, and a connection tube attached to the attaching hole by photocurable resin is provided. Here, the above-described photocurable resin is characterized by being a resin cured in a shape to close a gap between the attaching hole and the connection tube in a connection part. The photocurable resin is preferably polyurethane after the photocurable urethane gel-like body is cured.

Hardness of the polyurethane is preferably E60 or more and E100 or less (E100 is a measurement limit), more preferably E70 or more and E100 or less, and even more preferably E75 or more and E100 or less by hardness determined by type E durometer based on JIS K 6253. When the polyurethane has the aforementioned hardness, it is possible to obtain a strong pipe coupling that can withstand long-term use without the tube and photocured product easily coming off, after filling the photocurable urethane gel-like body in a screw hole, inserting the tube therein, and photocuring the gel-like body, for example.

5. Operation Effect

The manufacturing method of the tube-attached coupling structure of the present embodiment uses the photocurable gel-like body having the hole smaller than the outside diameter of the connection tube as the coupling, so that the outer surface of the tube and the coupling itself are bonded, and when the tube is attached, the coupling expands outward and closely fits (self moldability) into the attaching hole. This eliminates the need to prepare a piping coupling for each tube size and airtightness is also improved. There is no need for screw processing as in the conventional method, and cost of screw processing for products can be significantly reduced.

Alternatively, even if screw processing is applied to the attaching hole as in the conventional art, the coupling can be directly used, and the coupling itself expands among the thread ridges by insertion of the tube and can more enhance airtight seal. By using the photocurable gel-like body coupling corresponding to the diameter of the screw hole even if the standards of screw processing are different, the coupling is highly versatile in that it has compatibility with all screws. Furthermore, the photocurable gel-like body coupling can be closely fitted into the attaching hole by curing the photocurable gel-like body coupling by light irradiation, and has airtight sealing performance, so that an operation for securing airtightness by a seal tape or the like is not required to reduce man-hours significantly, which is also advantageous in terms of cost.

Next, the present invention will be described in more detail by following examples, but should not be limited by the following examples in any way.

EXAMPLES

Example 1

The photocurable composition: thermosetting composition was 50:50 in mass ratio.

49.75 parts by mass of polyfunctional urethane (meth) acrylate: KRM8904 (manufactured by Daicel Allnex Corporation, no residual hydroxyl groups, Mw: 1800), 0.25 parts by mass of photopolymerization initiator: bis(2,4,6-trimethylbenzoyl)phenylphosphine oxide (name: Omnirad 819, manufactured by IGM Resins B. V.), 48.46 parts by mass of "set of a polyol compound and an isocyanate compound (PC-30,manufactured by Polysys Co., Ltd.) ", 1.54 parts by mass of hydroxyl group-giving additive pentaerythritol (tri/tetra)acrylate (name: PETRA, manufactured by Daicel Allnex Corporation), and 0.74 parts by mass of dehydrated acetone as a solvent were mixed and heated to produce a photocurable urethane gel-like body. Here, parts by mass have the same meaning as % by mass representing a blending ratio, and 100 parts by mass of a total blended amount is 20 g. The specific manufacturing method of the photocurable urethan gel-like body is as follows.

First, the photopolymerization initiator was dissolved in the dehydrated acetone, and the dissolved material was added to the polyfunctional urethane (meth)acrylate. The mixture of the photopolymerization initiator, the polyfunctional urethane (meth)acrylate, and the dehydrated acetone was heated at a temperature of 95° C. in the atmosphere while being stirred until air bubbles due to volatilization of the dehydrated acetone were not visually recognized.

The hydroxyl group-giving additive was added to the polyol compound that is the main ingredient of the polyurethane and was stirred at a room temperature. Thereafter, an isocyanate compound as a curing agent was mixed into the stirred material and stirred. The compound ratio of the main ingredient and the curing agent (main ingredient: curing agent) was approximately 100:85 in mass ratio.

Thereafter, the photocurable composition obtained by mixing the aforementioned photopolymerization initiator and the polyfunctional urethane (meth)acrylate, and the thermosetting composition obtained by mixing the hydroxyl group-giving additive, the polyol compound, and the isocyanate compound were stirred and mixed, were poured into a molding die of silicon resin, and heated and cured at 100° C. for two hours. Then, the gel-like body after heating was extracted from the molding die, and the hardness of the gel-like body was measured. The molding die has the shape with protrusion in a center of a concave shape as shown in FIG. 2. Accordingly, the gel-like body extracted from the molding die is in a hollow cylindrical form, and a connection tube can be easily inserted into the hole in the center.

The hardness of the photocurable urethane gel-like body after thermosetting was measured by using the type E durometer (manufactured by Niigata Seiki Co., Ltd., name: ADM-E) based on JIS K 6253 "Hardness test method for vulcanized rubber".

The hardness of the photocurable urethane gel-like body (referred to as "E hardness") was determined to be passed when it was E1 or more and E30 or less, and it was determined to be failed when it was less than E1 or more than E30. When the hardness is in the range of E1 to E30 inclusive, it is suitable for use as a pipe coupling by being filled in a screw hole. Especially when the gel-like body is used for attaching a tube instead of a one-touch coupling, the gel-like body is easily filled in the screw hole of the attaching destination, and it is also easy to insert the tube into the gel-like body and penetrate it. This is because the gel-like body is suitable for a pipe coupling application since it has appropriate hardness, does not liquefy, and can ensure sealing performance of the tube and the screw hole.

Subsequently, the gel-like body extracted from the molding die was fitted into the attaching hole of the base body. Then, the tube was inserted into the center hole of the fitted gel-like body to a sufficient depth. Next, light irradiation was performed from an upper part of the gel-like body by using the light irradiation device manufactured by Iris Ohyama Co., Ltd. (model number: LWK-1300Z, use of visible light LED light, illuminance: 1300 lm, irradiation time: 120 seconds), and the above-described photocurable urethane gel-like body was photocured. After photocuring, the gel-like body was cooled to an atmospheric temperature, and it was confirmed that the tube attached to the base body was closely fitted and fixed to the attaching hole.

As a result that the E hardness of the urethane cured body after photocuring of the photocurable urethane gel-like body was measured, the hardness was E81, and it was possible to obtain the strong pipe coupling that withstands long-term use without the tube and the photocured product easily coming off.

INDUSTRIAL APPLICABILITY

The present invention can be used, for example, as a coupling for fluid equipment or pneumatic piping.

The invention claimed is:

1. A manufacturing method of a tube-attached coupling structure in which a connection tube is attached to a base body having an attaching hole, the method comprising the steps of:

preparing a photocurable gel-like body in a hollow cylindrical shape;

fitting the photocurable gel-like body into the attaching hole;

inserting an end portion of the connection tube into a hollow hole of the photocurable gel-like body; and curing the photocurable gel-like body by irradiating the photocurable gel-like body with light, wherein the step of preparing the photocurable gel-like body includes producing the photocurable gel-like body in the hollow cylindrical shape by pouring a solution of a photocurable gel-like body before gelation into a molding die, the solution contains a polyfunctional urethane (meth) acrylate and a photopolymerization initiator, the solution is heated after being poured into the molding die to form the hollow cylindrical photocurable gel-like body, and the hollow cylindrical photocurable gel-like body obtained after molding and heating has elastic self-moldability before photocuring and is capable of expanding outward to fit the inner wall of the attaching hole after inserting the connection tube.

2. The manufacturing method of a tube-attached coupling structure of claim 1, wherein the attaching hole has a reverse tapered shape in which a diameter expands toward an inside from a surface of the base body.

3. The manufacturing method of a tube-attached coupling structure of claim 1, wherein the base body has annular, spiral or dot-shaped irregularities, on an inner surface of the attaching hole.

4. The manufacturing method of a tube-attached coupling structure of claim 1, wherein the photocurable gel-like body includes polyurethane.

5. The manufacturing method of a tube-attached coupling structure of claim 4, wherein the photocurable gel-like body has hardness of E1 or more and E30 or less by measurement by a durometer based on JIS K 6235.

* * * * *